United States Patent [19]
McMillan et al.

[11] Patent Number: 6,038,921
[45] Date of Patent: Mar. 21, 2000

[54] MASS FLOW SENSOR SYSTEM FOR FAST TEMPERATURE SENSING RESPONSES

[75] Inventors: Robert D. McMillan; Robert M. McMillan, both of Georgetown, Tex.

[73] Assignee: McMillan Company, Georgetown, Tex.

[21] Appl. No.: 08/950,643

[22] Filed: Oct. 15, 1997

[51] Int. Cl.$^7$ .................................................. G01F 1/68
[52] U.S. Cl. ...................................................... 73/204.23
[58] Field of Search .......................... 73/204.23, 204.16, 73/204.15, 204.27

[56] References Cited

U.S. PATENT DOCUMENTS

| | | | |
|---|---|---|---|
| 4,297,881 | 11/1981 | Sasayama et al. | 73/204 |
| 4,576,182 | 3/1986 | Normann | 128/692 |
| 4,672,847 | 6/1987 | Uchiyama et al. | 73/204.27 |
| 4,843,881 | 7/1989 | Hubbard | 73/204.16 |
| 5,222,395 | 6/1993 | Matubara et al. | 73/204.18 |
| 5,279,154 | 1/1994 | Vavra et al. | 73/202.5 |
| 5,332,005 | 7/1994 | Baan | 138/43 |
| 5,410,912 | 5/1995 | Suzuki | 73/204.15 |
| 5,481,905 | 1/1996 | Pratt | 73/115 |
| 5,557,973 | 9/1996 | Koudal et al. | 73/861.355 |
| 5,602,345 | 2/1997 | Wenger et al. | 73/861.357 |

*Primary Examiner*—Benjamin R. Fuller
*Assistant Examiner*—Jewel V. Thompson
*Attorney, Agent, or Firm*—Bracewell & Patterson, L.L.P.

[57] ABSTRACT

A sensing circuit of a thermal mass flow sensor provides enhanced precision control of heating and temperature sensing coils used for fast sensing responses. The sensing circuit includes a pair of coil servo loops achieving servo loop control of the sensing coils in each servo loop. The current paths in the servo loop include a main current path carrying low levels of current and minor current paths carrying very small levels of current. These small levels of current have insignificant current levels compared to the levels of current in the main current path. The single main current path in the servo loop allows nearly all of the current from the primary servo amplifier to be used for driving the coils, thereby improving the efficiency of the coil servo loop. The heating and sensing coil in each servo loop is coupled to an integration network for measuring power provided to the coil. The coil is also coupled to a voltage follower network for providing a programmable voltage level to the integration network to compensate for any differing coil parameters between the sensing coils. Thus, the sensing circuit has the flexibility to accommodate coil parameter differences. Further, the heating and sensing coils of the servo loops are wrapped around a sensing tube of a mass flow sensing apparatus. The sensing tube is short and holds a low fluid mass, allowing for small sensing coils, a fast sensing response, and insensitivity of the sensing tube to the position of the heating and sensing coils.

20 Claims, 1 Drawing Sheet

MASS FLOW SENSOR SYSTEM FOR FAST TEMPERATURE SENSING RESPONSES

BACKGROUND OF THE INVENTION

1. Field of the Invention

The present invention relates to thermal mass flow sensors.

2. Description of the Related Art

Circuits for mass flow sensors have long used a bridge configuration in measuring the mass flow rate of a fluid. The common bridge configurations included a servo constant temperature configuration, such as Hubbard, U.S. Pat. No. 4,843,881, and a constant current configuration. The bridge configurations were included as a part of a feedback network or servo loop.

The servo loop of the constant temperature configuration has required numerous current paths to be driven by a differential amplifier. That differential amplifier was used to drive the current path including an inductive heating and sensing coil for heating the fluid and sensing the mass flow rate of the fluid. Servo loop control of the sensing coil was undesirably influenced by the power requirements for the numerous current paths that did not drive the sensing coil. The power requirements of some of these current paths were at current levels on the order of 50 to 80 mA. Other of these current paths were typically on the order of 0.1 to 0.5 mA. As can thus be appreciated, these current paths typically carried high levels or amounts of current.

The constant current configuration has required even higher levels of current typically on the order of 160 mA. In the constant current bridge, the current paths were more interdependent than the current paths present in the servo loop of a constant temperature configuration. The high levels of current present in both configurations were unsuited to sensing coils used for fast temperature sensing responses.

Further, sensors using bridge configurations have required sensing coils in arms of the bridges to have the same coil parameters in order to achieve optimum sensing performance. Typical coil parameters included the number of coil turns, the electrical resistance of the coils, and the temperature coefficients of change of the coils. Lack of uniformity of these coil parameters has been a significant limitation on the performance of mass flow sensors using bridge configurations. Coils with even slightly differing parameters have significantly reduced the performance of such mass flow sensors.

SUMMARY OF THE INVENTION

A sensing circuit of a thermal mass flow sensor is provided for enhanced precision control of heating and temperature sensing coils used for fast sensing responses. The sensing circuit includes a pair of coil servo loops for achieving servo loop control of the sensing coils in each servo loop. Each servo loop in the sensing circuit includes one leg that is driven by a primary servo amplifier. The current paths in the servo loop include a main current path carrying low levels of current and minor current paths carrying very small levels of current. These small levels of current have insignificant current levels compared to the levels of current in the main current path. The use of a single main current path in the servo loop allows for nearly all of the current from the primary servo amplifier to be used for driving the coils, thereby improving the efficiency of the coil servo loop. A portion of the minor current paths is provided to a secondary servo amplifier. Since a servo amplifier requires little current, the use of a servo amplifier in the minor current paths allows for very small levels of current in such paths.

The heating and sensing coil in the servo loop is coupled to the primary servo amplifier configured as an integration network for measuring, amplifying, and linearizing power provided to the coil. The heating and sensing coil is also coupled to the secondary servo amplifier configured as a voltage follower network for providing a programmable voltage level to the integration network to compensate for any differing coil parameters between the sensing coils. The programmable voltage level is achieved by using a programmable reference resistor. The sensing circuit thus has the flexibility to accommodate coil parameter differences.

Further, the sensing coils of the servo loops are wrapped around a sensing tube of a mass flow sensing apparatus. The mass flow sensing apparatus includes a flow chamber for housing incoming fluid and outgoing fluid, an incoming flow tube for directing the incoming fluid to the sensing tube, an outgoing flow tube for directing outgoing fluid exiting the sensing tube, and a flow bypass element for receiving a portion of the incoming fluid to bypass the sensing tube. The sensing tube of the mass flow sensing apparatus is short and holds a low fluid mass, allowing for small sensing coils, a fast temperature sensing response, and insensitivity of the sensing tube to the position of the heating and sensing coils.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
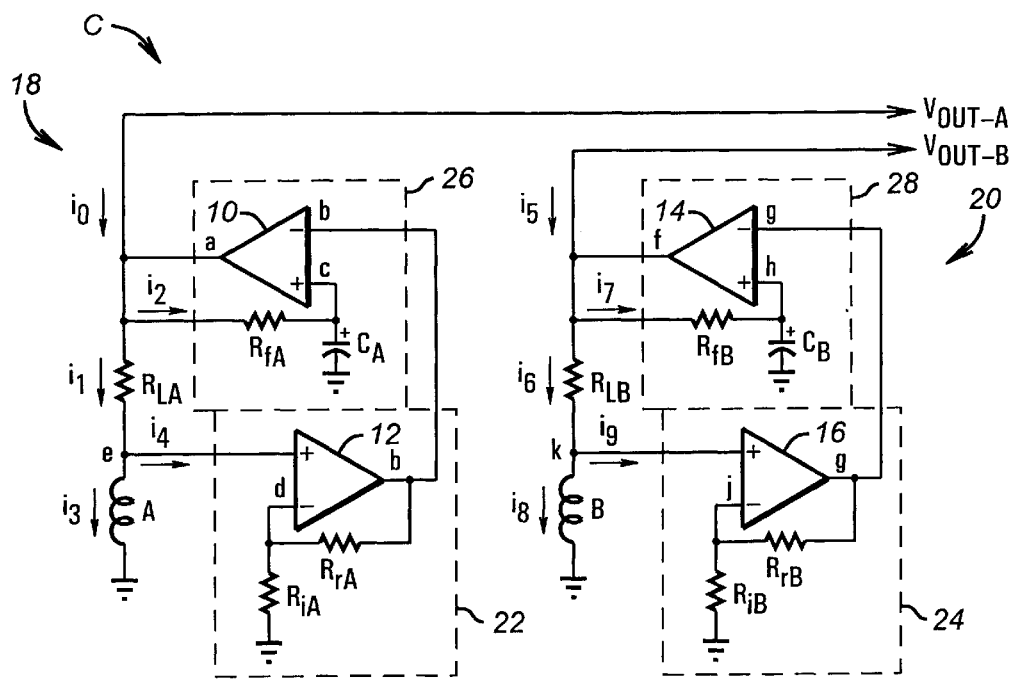
FIG. 1 is an electrical circuit schematic diagram of an embodiment of the mass flow sensor circuit of a mass flow sensor according to the present invention.

Turning now to the drawings, FIG. 1 shows an electrical circuit schematic diagram of a mass flow sensor circuit C of a mass flow sensor S according to the present invention. The circuit C (FIG. 1) includes a pair of sensor coils A and B (FIGS. 1 and 2) for sensing the mass flow rate of a fluid through the sensor S. The sensor coils A and B are respectively provided in servo coil loops 18 and 20. Each of the servo coil loops 18 and 20 is used to achieve servo loop or feedback network control over the temperature of the sensor coils A and B, respectively, in such loop.

The circuit configuration of the present invention uses integration networks 26 and 28 and voltage follower networks 22 and 24 for servo loop control over sensor coils A and B. In particular, the sensor circuit C includes primary servo amplifiers 10 and 14 configured as integrators to form integration networks 26 and 28 and secondary servo amplifiers 12 and) 16 configured to form voltage follower networks 22 and 24. This circuit configuration allows nearly all of the current from the primary servo amplifiers 10 and 14 to drive the sensor coils A and B. The increased percentage of outputted current used to drive the sensor coils A and B enhances the responsiveness and improves the accuracy of control of the sensor S.

The integration operation performed by the integration networks 26 and 28 measures, amplifies, and linearizes the power provided to each sensor coil A and B. The output voltages $V_{OUT-A}$ and $V_{OUT-B}$, produced by this operation are indicative of the mass flow rate of the fluid through the sensor S. The voltage follower networks 22 and 24 formed by the secondary servo amplifiers 12 and 16 allow the programmable outputs of the secondary servo amplifiers 12 and 16 to be provided as inputs to the primary servo amplifiers 10 and 14. The outputs of the secondary servo amplifiers 12 and 16 are programmable since the amplifiers are coupled to programmable reference resistors $R_{rA}$ and $R_{rB}$.

The integration networks 26 and 28 the voltage follower networks 22 and 24 of the sensor circuit C do not require minor current paths with significantly high levels of current. In the mass flow sensing circuit C, the servo amplifiers 10 and 14 configured as integrators for driving the associated sensor coils A and B drive only one current path, which is termed the main current path. The main current path for the servo coil loop 18 and its associated coil A corresponds to the currents $i_0$, $i_1$, and $i_3$. The main current path for the servo coil loop 20 and its associated coil B corresponds to the currents $i_5$, $i_6$, and $i_8$.

Current paths of the circuit C other than the main current path may be termed minor current paths. Minor current paths for the servo coil loop 18 correspond to the currents $i_2$, and $i_4$. Minor current paths for the servo coil loop 20 correspond to the currents $i_7$ and $i_9$. The minor current paths in the circuit C carry very small levels of current, typically on the order of less than 10 pA, and therefore do not need to be driven by the servo amplifiers 10 and 14. The use of minor current paths carrying small levels of current in accordance with the present invention allows for nearly all of the current from the primary servo amplifiers 10 and 14 for driving the coils A and B. Thus, the efficiency of the mass flow sensor circuit C is improved.

In addition, the circuit configuration of the present invention allows for a portion of the current in the minor current paths, namely the current $i_4$ in servo loop 18 and the current $i_9$ in servo loop 20, to be provided to secondary servo amplifiers 12 and 16, which are configured as voltage followers. Since a servo amplifier draws very little current, adding a servo amplifier into the minor current paths in each servo loop 18 and 20 in accordance with the present invention allows for very small levels of current in the minor current paths. The sensor circuit C thus provides more sensing flexibility than conventional sensor circuits using bridge configurations.

The primary servo amplifiers 10 and 14 forming integration networks 26 and 28 respectively have inverting input terminals (b) and (g), non-inverting input terminals (c) and (h), and output terminals (a) and (f). The output terminals (a) and (f) are coupled, respectively, to servo output load resistors $R_{LA}$ and $R_{LB}$. Changes to the resistance of the servo output load resistors $R_{LA}$ and $R_{LB}$ affect the servo loop control of the sensor coils A and B. The servo output load resistors $R_{LA}$ and $R_{LB}$ are coupled, respectively, to coils A and B through voltage nodes (e) and (k). The non-inverting input terminals are coupled to feedback resistors $R_{fA}$ and $R_{fB}$ and capacitors $C_A$ and $C_B$, respectively. The impedance produced by this resistance and capacitance defines the gain and frequency response of the primary amplifiers 10 and 14.

The inverting input terminals are coupled to the secondary servo amplifiers 12 and 16. The output terminals (b) and (g) and the inverting input terminals (d) and (j) are coupled to input resistors $R_{iA}$ and $R_{iB}$ and reference resistors $R_{rA}$ and $R_{rB}$, respectively. By adjusting one of the reference resistors to account for coil parameter differences between sensor coils A and B, the circuit C compensates for coil parameter variance without adjusting the resistance of the servo output load resistors $R_{LA}$ and $R_{LB}$. Thus, the present invention circuit configuration allows for adjustments to the coil parameters of one of the coils without altering the resistance of the servo output load resistors $R_{LA}$ and $R_{LB}$ in the circuit C. From the electrical circuit schematic diagram shown in FIG. 1, circuit equations may be derived for the mass flow sensor circuit C of the present invention using techniques known in the art to represent the coil parameters of sensor coils A and B as a function of the programmable reference resistors $R_{rA}$ and $R_{rB}$ in the circuit C.

Conventional mass flow sensor circuits have used a bridge configuration to control the temperature of sensor coils. In a bridge configuration, current outputs from a servo amplifier have been split or shared between driving a sensor coil and other legs of the bridge. The common bridge configurations included a servo constant temperature configuration, such as Hubbard, U.S. Pat. No. 4,843,881, or a constant current configuration. The bridge configurations were included as a part of a feedback network or servo loop. The servo loop of the servo constant temperature configuration, however, has required numerous current paths to be driven by a differential amplifier. That differential amplifier was also used to drive the current path including the inductive coil for sensing the mass flow rate of a fluid. Servo loop control of the sensing coil was undesirably influenced by the power requirements for numerous current paths that did not serve to drive the sensing coil.

Further, the minor current paths of conventional bridge configurations carried significantly large levels of current which are unsuited to sensors used for fast temperature sensing responses. For a servo constant temperature configuration, some of the minor current paths were typically on the order of 50 to 80 mA and other of the minor current paths were typically on the order of 0.1 to 0.5 mA. The constant current configuration has required even higher levels of current typically on the order of 160 mA. In the constant current bridge, the current paths were more interdependent than the current paths present in the servo loop of a constant temperature configuration.

The servo loops of sensor circuit C of the present invention, however, include a main current path carrying low levels of current and minor current paths carry very small levels of current. These small levels of current have insignificant current levels compared to the levels of current in the main current path. The small levels of current may be on the order of less than 10 pA.

In addition, the bridge configurations of conventional mass flow sensors have required sensing coils in arms of the bridges to have the same coil parameters in order to achieve optimum sensing performance. Lack of uniformity of these coil parameters, which may include the number of coil turns, the electrical resistance of the coils, and the temperature coefficients of change of the coils, has been a significant limitation on the performance of mass flow sensors using bridge configurations. Coils with even slightly differing parameters have significantly reduced the performance of such mass flow sensors.

The sensing coils of the present invention, however, are coupled to voltage follower networks 22 and 24. One or both of the voltage follower networks 22 and 24 may provide a programmable voltage level to the respective integration network to compensate for any differing coil parameters between the sensing coils A and B. The programmable voltage level is achieved by using a programmable reference resistor. Either resistor $R_{rA}$ or resistor $R_{rB}$ may be selected to provide a programmable voltage level.

Figure 2:
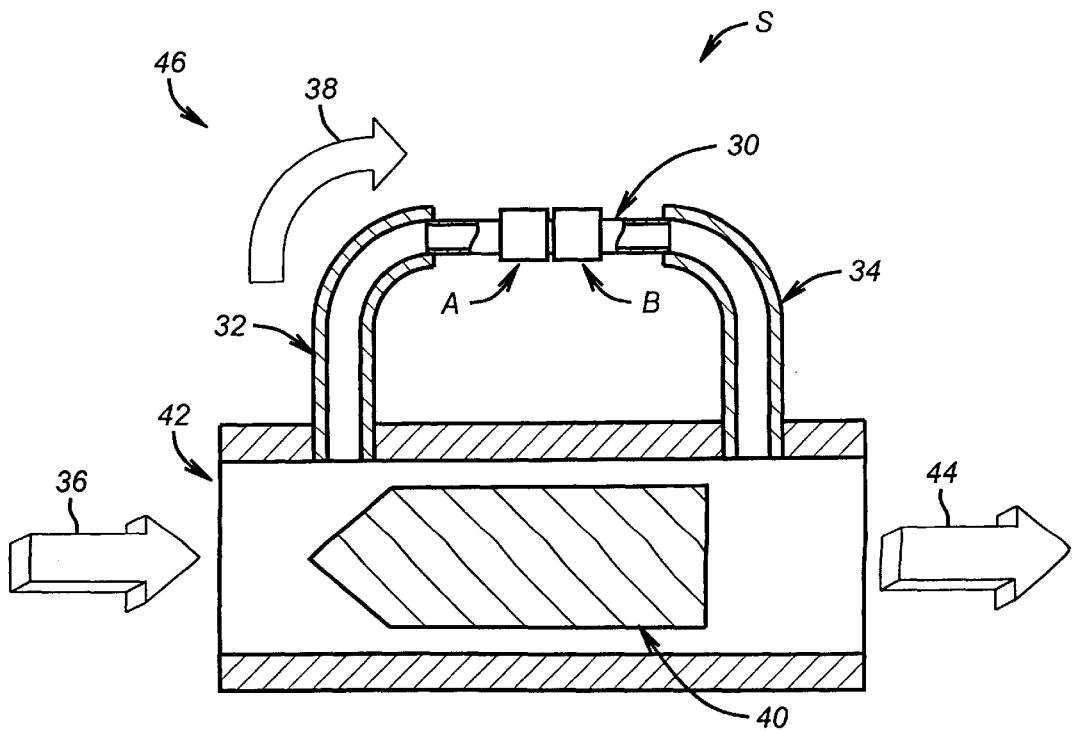
FIG. 2 is an elevation view, taken partly in cross-section of a mass flow sensing apparatus of the mass flow sensor of the present invention.

Turning to FIG. 2, the physical structure of a mass flow sensing apparatus 46 of the present invention is shown. The mass flow sensing apparatus 46 includes a flow chamber 42 for housing incoming fluid 36 and outgoing fluid 44, and an incoming flow tube 32 for directing the incoming fluid 36 to the sensing tube 30. The apparatus 46 also includes an outgoing flow tube 34 for directing outgoing fluid 44 exiting the sensing tube 30, a sensing tube 30 coupled between the outgoing flow tube 34 and the incoming flow tube 32, and a laminar flow bypass element 40 for receiving a certain portion of the incoming fluid to bypass the sensing tube 30.

The incoming flow tube 32 and outgoing flow tube 34 are preferably curved and connected to the sensor tube 30 using low thermal conductivity epoxy or other known bonding techniques. The sensor tube 30 has a thinner wall and small interior diameter than the incoming flow tube 32 and outgoing flow tube 34. Also, the sensor tube 30 is coupled to the coils A and B of the mass flow sensor circuit C of FIG. 1. The coils A and B heat the fluid in the sensor tube 30 and sense the mass flow rate of the fluid.

The significant length of a conventional sensing tube has limited the sensor coils coupled to the sensing tube to slow or moderate temperature sensing responses. The sensing tube 30 of the present invention, however, is short and holds a low fluid mass, allowing for small sensing coils A and B, a fast temperature sensing response, and insensitivity of the sensing tube 30 to the position of the sensing coils A and B. Though the sensor tube 30 has a smaller diameter and length than the flow bypass element 40, the reduced size of the present invention sensing tube 30 allows for a shorter flow bypass element 40.

A short sensing tube 30 allows for a fast temperature sensing response by reducing the distance between the coils A and B coupled to the sensor tube 30. Absent a heating source, as fluid flows through a tube, that fluid loses heat. The coils A and B maintain a constant temperature for the fluid in the tube by heating the fluid. As the fluid travels from a portion of the tube 30 near coil A to a portion of the tube 30 near coil B, coil B requires more power than coil A to maintain a constant temperature for its surrounding fluid. Because the sensing tube 30 is short and holds little fluid at any one time, very little current is required to keep the temperature of the fluid within the tube 30 constant. By reducing the distance between coils A and B, less time is required for the fluid to travel from a portion of the tube 30 near coil A to a portion of the tube near coil B. As a result, the differences in power inputted to each coil to maintain a constant temperature for the fluid is more quickly measured. The tube 30 is short in the sense that the tube 30 provides just enough tube length for spaced coils A and B to sufficiently detect differences in power furnished to each coil to maintain a constant temperature for the fluid in the tube 30. An exemplary range for the length of the short tube 30 is 0.50 to 0.75 inches which is 2 to 4 times less than conventional designs.

In addition, because the sensing tube 30 is short, differences in locations of the coils with respect to the tube 30 do not significantly affect the temperature sensing response time of the circuit C. As a result, the short sensing tube 30 of the present invention is insensitive to the particular positions of coils A and B along the tube 30.

Thus, the configuration of the mass flow sensing circuit of the present invention provides the flexibility for a servo amplifier to be nearly dedicated to driving a heating and sensing coil and for coil parameter compensation without adjustments to servo output load resistance in the circuit. It should be understood that various combinations of integration networks, voltage follower networks and coils may be used to achieve other embodiments of the sensing circuit of the present invention. Further, the mass flow sensing apparatus and sensing tube of the present invention, which are coupled to the mass flow sensing circuit, allow for fast temperature sensing responses and insensitivity of the sensing tube to the position of the sensor coils.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A mass flow sensing circuit of a sensor adapted for improved sensing flexibility, comprising:
    at least one inductive heating and sensing coil for heating a fluid passing through the sensor to maintain a constant temperature for the fluid, the mass flow rate of the fluid derived from power necessary to maintain a constant temperature for the fluid;
    at least one integrator measuring the power provided to said coil; and
    at least one voltage follower network coupled to said coil and said integration network for providing a programmable voltage level to said integration network to adjust the coil parameters of said coil.

2. The mass flow circuit of claim 1, wherein said integration network comprises a pair of integrators measuring power provided to a pair of heating and sensing coils.

3. The mass flow circuit of claim 2, wherein said coil comprises a pair of inductive heating and sensing coils for heating a fluid passing through the sensor to maintain a constant temperature for the fluid, the mass flow rate of the fluid derived from power necessary to maintain a constant temperature for the fluid.

4. The mass flow circuit of claim 3, wherein said voltage follower network comprises a pair of voltage follower networks, each respectively coupled to a respective one of the pair of inductive heating and sensing coils and to a respective one of the pair of integrators and providing programmable voltage levels to the pair of integrators to adjust the coil parameters of one coil to substantially match the parameters of the other coil.

5. The mass flow circuit of claim 1, wherein intregrator comprises a servo amplifier.

6. The mass flow circuit of claim 1, wherein said voltage follower network comprises a servo amplifier configured as a voltage follower.

7. A coil servo loop for a thermal mass flow sensing circuit of a sensor adapted to measure mass flow rate of a fluid through the sensor with improved sensing flexibility, comprising:
    an inductive heating and sensing coil providing power to heat the fluid and sensing mass flow of the fluid;
    a main current path for providing low levels of current to the inductive heating and sensing coil;
    a primary servo amplifier outputting low levels of current to drive said main current path;
    a first minor current path coupled to said main current path for providing very small levels of current to said primary servo amplifier;

a second minor current path coupled to said main current path for providing very small levels of current to a secondary servo amplifier;

a secondary servo amplifier receiving very small levels of current from said second minor current path and driving very small levels of current into said primary servo amplifier; and the inductive heating and sensing coil receiving low levels of current from said main current path, heating a fluid passing through the sensor to maintain a constant temperature for the fluid, the mass flow of the fluid sensed by said inductive heating and sensing coil being derived from the power provided to maintain a constant temperature for the fluid, the power supplied to said inductive heating and sensing coil being compared with power supplied to a sensing coil in another coil servo loop of the sensing circuit to sense differences in power, the sensed differences in power being amplified and linearized to produce voltage values proportional to the mass flow rate of the fluid sensed by said coil.

8. The coil servo loop of claim 7, wherein said primary servo amplifier precision controls the low levels of current provided to said inductive sensing coil.

9. The coil servo loop of claim 7, wherein said low levels of current are on the order of 50 mA.

10. The coil servo loop of claim 7, wherein said very small levels of current are on the order of less than 10 pA.

11. The coil servo loop of claim 7, wherein said very small levels of current are insignificant levels of current compared to said low levels of current.

12. The coil servo loop of claim 7, wherein said first minor current path and said second minor current path are substantially independent of said low levels of current outputted by said primary servo amplifier.

13. An improved mass flow sensing circuit of a sensor compensating for coil parameter variances between a pair of sensor coils, comprising:

a first coil servo loop, comprising:
  a first main current path for providing low levels of current to a first of the pair of sensor coils;
  a first primary servo amplifier outputting low levels of current to said first main path;
  a first minor current path coupled to said first main current path for providing very small levels of current to said first primary servo amplifier;
  a second minor current path coupled to said first main current path for providing very small levels of current to said first secondary servo amplifier;
  a first secondary servo amplifier receiving very small levels of current from said second minor current path and driving very small levels of current into said first primary servo amplifier; and
  a first inductive heating and sensing coil for receiving low levels of current from said first main current, heating a fluid passing through the sensor to maintain a constant temperature for the fluid, the power provided to said coil maintaining a constant temperature for the fluid; and a second coil servo loop, comprising:
a second main current path for providing low levels of current to a second of the pair of sensor coils;

a second primary servo amplifier outputting low levels of current to said second main path;
a third minor current path coupled to said second main current path for providing very small levels of current to said second primary servo amplifier;
a fourth minor current path coupled to said second main current path for providing very small levels of current to a second secondary servo amplifier;
a second secondary servo amplifier receiving very small levels of current from said second minor current path and driving very small levels of current into said second primary servo amplifier;
a second inductive heating and sensing coil for receiving low levels of current from said first main current, heating a fluid passing through the sensor to maintain a constant temperature for the fluid, the power provided to said coil maintaining a constant temperature for the fluid; and
a servo output load resistor in said second main current path receiving low levels of current from said second primary servo amplifier; and
a programmable reference resistor coupled to said second secondary amplifier for adjusting the parameters of said second coil to match the parameters of said first coil without adjusting the resistance of said servo output load resistor;

wherein the difference between the power supplied to said coils is amplified and linearized to produce voltage values proportional to the mass flow rate of the fluid sensed by said coils.

14. The mass flow sensing circuit of claim 13, wherein said first inductive heating and sensing coil and said second inductive heating and sensing coil have differing coil parameters.

15. The mass flow sensing circuit of claim 13, wherein said first inductive heating and sensing coil and said second inductive heating and sensing coil produce fast temperature sensing responses.

16. The mass flow sensing circuit of claim 13, wherein said first primary servo amplifier precision controls the low levels of current provided to said first inductive heating and sensing coil and said second primary servo amplifier precision controls the low levels of current provided to said second inductive heating and sensing coil.

17. The mass flow sensing circuit of claim 13, wherein said low levels of current are on the order of 50 mA.

18. The mass flow sensing circuit of claim 13, wherein said very small levels of current are on the order of less than 10 pA.

19. The mass flow sensing circuit of claim 13, wherein said very small levels of current are insignificant levels of current compared to said low levels of current.

20. The mass flow sensing circuit of claim 13, wherein said first minor current path and said second minor current path are substantially independent of said low levels of current outputted by said first primary servo amplifier and said third minor current path and said fourth minor current path are substantially independent of said low levels of current outputted by said second primary servo amplifier.

* * * * *